April 11, 1961    J. F. WERR    2,979,585
CONDITION SENSOR
Filed Aug. 1, 1958
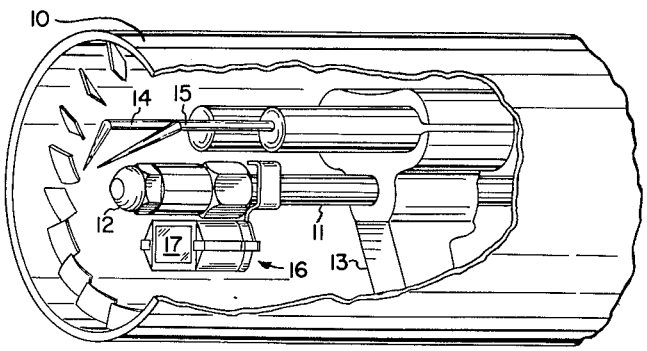
Fig. 1
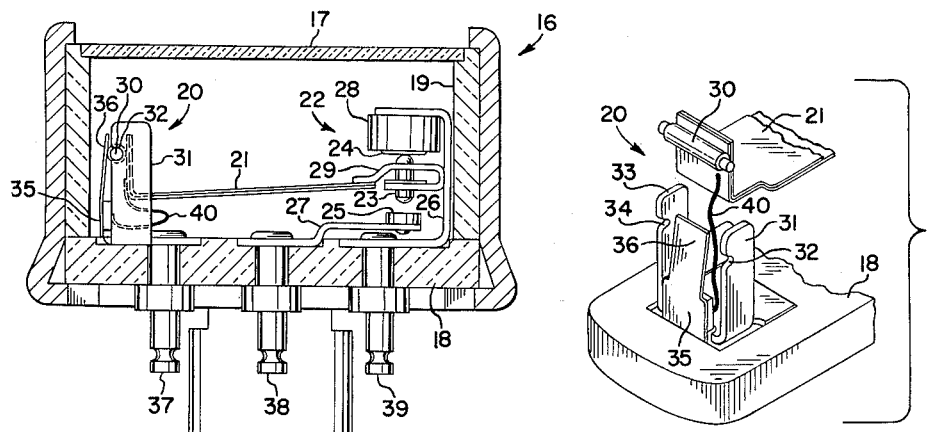
Fig. 2
Fig. 3
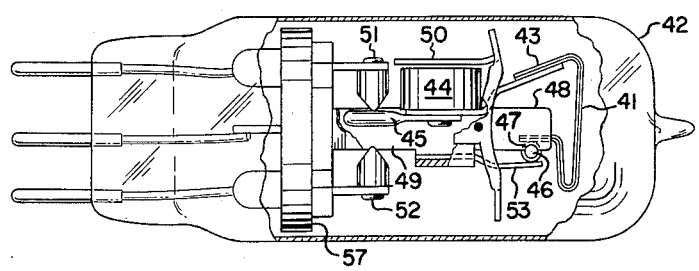
Fig. 4
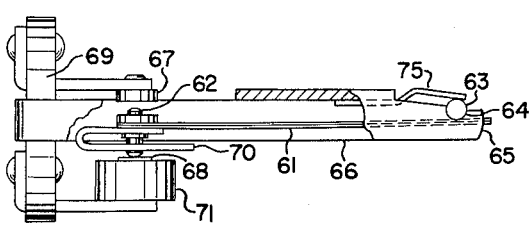
Fig. 5
INVENTOR.
JOHN F. WERR
BY
Francis A. Sirr
ATTORNEY United States Patent Office 2,979,585
Patented Apr. 11, 1961

2,979,585

CONDITION SENSOR

John F. Werr, St. Louis Park, Minn., assignor to Minneapolis-Honeywell Regulator Company, Minneapolis, Minn., a corporation of Delaware Filed Aug. 1, 1958, Ser. No. 752,636

2 Claims. (Cl. 200—138)

This invention is concerned with an improved condition sensor and more particularly with a condition sensor of the type requiring the use of a slip friction portion, wherein an improved structure is provided in the slip friction portion to thereby yield a superior sensor.

Specifically, this invention relates to a temperature responsive condition sensor utilizing a bimetal member which is provided with a free end mounting a movable switch blade cooperating with fixed switch contacts. The bimetal condition sensor has a shaft mounted on a portion thereof and this shaft is positioned in grooves or indentions provided in a pair of support arms. The bimetal element is mounted in relation to the support arms by means of a spring member which not only provides a force to physically hold the shaft thereof in relation to the support arms, but also provides a slip friction force which determines the contact pressure which may be built up between the movable switch blade and the fixed switch contacts due to a temperature change being experienced by the bimetal element. Once this contact pressure has been built up, any further force which tends to be exerted by a subsequent temperature change at the bimetal is absorbed by rotation of the shaft relative to the support arms.

The preferred modifications of the present invention are relatively small flame sensing condition sensors which are adapted to be mounted in relation to a fuel burner unit, for example, in the blast tube of a gun type oil burner. In apparatus of this type it is essential that the presence of flame be indicated in a relatively short period of time. Therefore, the sensors of the present invention provide for switching action to take place when the condition sensors experience a relatively small temperature change. However, since the sensor is mounted in close proximity to the fuel burner unit, there is a considerable temperature over-run after the presence of flame is indicated and in order to prevent excessive stresses being built up with the sensor and specifically the temperature sensitive bimetal thereof, it is necessary to provide a slip friction mounting for the bimetal.

The presence of the slip friction mounting for the bimetal also allows the condition sensor to sense the absence of flame in a relatively short time. Since the slip friction mounting of the bimetal determines the maximum force which can be exerted at the movable switch member, the temperature of the bimetal need decrease only enough to release this force in order for the absence of flame to be detected.

It is therefore an object of the present invention to provide an improved condition sensor having a condition sensitive member which is provided with a shaft which is mounted in relation to a support member by means of grooves provided in the support member and which has a spring member engaging the shaft to thereby both mount the condition sensitive member in the grooves and to also exert a slip friction force which must be overcome before the shaft will move relative to the support member.

It is a further object of the present invention to provide an improved condition sensor having a bimetal temperature responsive element with switch means controlled by one portion thereof and having a shaft at another portion thereof, the condition sensor also having support means including a pair of extending arms having open indentions formed therein to receive the shaft of the bimetal, and further having a spring member mounted in fixed relation to the support member and engaging the shaft to thereby mount the bimetal in relation to the support member such that upon the bimetal experiencing a temperature change, a given force may be built up at the switch means and upon a subsequent temperature change being experienced by the bimetal, this change is absorbed by a rotation of the shaft in the indentions.

These and other objects of the present invention will be apparent upon reference to the following specification, claims and drawing, of which—

Figure 1 is a showing of the impoved condition sensor mounted on the oil pipe of a gun type oil burner, showing a portion of the blast tube housing of the oil burner broken away, Figure 2 is a view of the condition sensor showing a portion of the case broken away, Figure 3 is an exploded view of the slip friction portion of the condition sensor of Figure 2, Figure 4 is a showing of a modification of the improved condition sensor, portions thereof being broken away, and Figure 5 is a showing of a further modification of the improved condition sensor, portions thereof being broken away.

Referring specifically to Figure 1, the reference numeral 10 designates the blast tube of a gun type oil burner, a portion of the blast tube being broken away to show the oil line 11 and the oil nozzle 12. The oil line 11 is supported by means of a support 13 which likewise mounts a pair of ignition electrodes 14 and 15, these ignition electrodes being disposed in igniting relation to the nozzle 12. The reference numeral 16 designates the improved condition sensor of the present invention. It can be seen that this sensor is mounted in viewing relation to the flame which may be present at the nozzle 12 and that the condition sensor 16 is thereby arranged to detect the presence or absence of flame at the gun type oil burner. The condition sensor is provided with a viewing window 17 at the forward face thereof thereby providing means whereby a condition sensitive bimetal is positioned within member 16 and views the flame at the nozzle 12.

Referring now to Figure 2, the condition sensor 16 is shown with portions thereof in cross section. The condition sensor 16 is provided with a base member 18 which in combination with a wall portion 19 and the window 17 forms a housing for the condition sensitive portion of the condition sensor. The device within the housing consists basically of three portions. The first of these is a slip friction means designated generally by means of the reference numeral 20. The second portion is a condition sensitive member in the form of a bimetal 21. The third portion is broadly defined as switch means 22 adapted to be controlled by the right hand end of the bimetal member 21.

Referring specifically to the switch means 22, this means includes a movable switch blade supporting a movable contact 23 and stationary switch contacts 24 and 25. The stationary switch contacts 24 and 25 are mounted by means of brackets 26 and 27 respectively, to the base member 18. The switch mechanism 22 is also provided with a magnet 28 which cooperates with a Curie point armature 29.

That portion of the apparatus disclosed in Figure 2, as well as Figures 4 and 5, which pertains to the manner in which the Curie point armature, the magnet, and the bimetal cooperate to provide an improved switching function is disclosed in the co-pending Theodore E. Larsen application, Serial No. 740,396, filed June 6, 1958. For the purposes of the present explanation, it suffices to say that the bimetal element is not effective to cause a switching action to take place until the Curie point armature has been heated to a certain temperature at which the magnet is no longer effective to maintain the mechanism in the cold position shown in Figures 2, 4 and 5.

The bimetal element 21 of Figure 2 is mounted in relation to the base 18 by means of a shaft 30 which is spot welded to the bimetal. Shaft 30 is positioned in the grooves or indentions formed in a pair of support arms, which are rigidly fixed to the base 18. In Figure 2, a single support arm 31 is shown having a groove or indention 32 in which the shaft 30 is loosely positioned. This construction is seen more clearly in Figure 3 which gives an exploded view of the slip friction portion 20 of Figure 2. Figure 3 shows the manner in which shaft 30 is fixed to bimetal 21, for example, by means of spot welding. Figure 3 also shows the support arm 31 of Figure 2 as well as a second support arm 33 which is hidden in Figure 2. Each of these arms is provided with a groove, idenitfied by means of the reference numerals 32 and 34 respectively. It can be seen that these grooves are open grooves that are formed on like surfaces of the arms 31 and 33 and that these grooves define an axis along which the shaft 30 of bimetal 21 is positioned. The slip friction means 20 is also provided with a spring member 35 which is fixed in relation to the arms 31 and 33 and which engages the shaft 30 at the upper portion 36 of the spring.

In Figure 2, the spring 35 is shown in the position wherein the spring exerts a force biasing the shaft 30 into the grooves 32 and 34 to thereby mount the bimetal 21 in relation to the support arms 31 and 33. Furthermore, not only does the spring member 35 mount the bimetal in relation to these support arms, but also, the spring 35 exerts a slip friction force which must be overcome by the force built up in bimetal 21 before the shaft 30 may rotate relative to the support arms 31 and 33.

Figure 3 shows the spring 35 in the relaxed position and it can be seen that in this position the upper end 36 of the spring substantially coincides or overlies the axis formed by grooves 32 and 34. Therefore, it will be appreciated that upon the shaft 30 being positioned in grooves 32 and 34 as shown in Figure 2, the spring member 35 exerts a force which mechanically holds bimetal 21 and also provides a slip friction force.

This improved construction provides a simple and yet reliable structure which is simple to assemble and accomplishes the results of mounting the bimetal 21 with respect to the support members 31 and 33 by means of a single spring 35 which serves the dual function of mounting the bimetal and also providing the slip friction force for the slip friction means 20.

The condition sensor 16 is provided with 3 electrical terminals 37, 38 and 39. Electrical terminal 39 makes connection to the stationary contact member 24. Terminal 38 makes electrical connection to the stationary contact 25. Terminal 37 makes electrical contact through a flexible lead wire 40 to the bimetal 21 and thereby to the moveable switch contact 23. The condition senor of Figure 2 is shown in its cold condition wherein the switch 23—24 is closed. Upon bimetal 21 experiencing a temperature rise, the bimetal flexes such that the free end, that is the right-hand end, moves in a downward direction. However, within the teachings of the above mentioned co-pending Theodore E. Larsen application, the free end of the bimetal moves only when the Curie point armature 29 has been heated to a given temperature. Thereupon, the switch 23—24 opens and the switch 23—24 closes.

It is desirable that a certain contact pressure be built up between the switch members 23—25 to insure good swtiching action. This is accomplished by a further temperature rise of bimetal 21. In most cases the bimetal experiences a relatively large temperature increase after the switch 23—25 is closed and therefore the slip friction connection 20 is provided to prevent undue stress being built up within the switching mechanism including bimetal 21. Spring 35 determines the contact pressure which can be exerted by bimetal 21 at switch 23—25. After a certain contact pressure has been reached, the continued flexing of bimetal 21 causes shaft 30 to rotate in grooves 32 and 34, the force of bimetal 21 overcoming the frictional force exerted by spring 35. This action insures that the high temperature rise experienced by bimetal 21 will in no way cause undue forces to be built up within the sensor 16.

The above description has been concerned with a temperature rise of bimetal 21 and the manner in which the slip friction means 20 functions in this instance. However, the slip friction means is also effective upon a subsequent temperature decreases experienced by bimetal 21. In this case, the slip friction 20 functions in a like manner to determine the contact pressure which will be exerted between the switch members 23 and 24, this contact force being selected to insure proper switching action and yet being limited to prevent damage to portions of the switching mechanism including bimetal 21.

Also, since the contact pressure in either the hot or cold position, that is with 23—25 or 23—24 closed, is controlled, the sensor 16 senses the presence or absence of flame at the fuel burner in the short time required for bimetal 21 to experience a realtively small temperature change which is effective to release this contact pressure.

Referring now specifically to Figure 4, this figure discloses a further modification of the present invention wherein a condition sensor in the form of a bimetal 41 views the flame through a glass envelope 42. The free end of bimetal 41 is identified by the reference numeral 43 and a magnet 44 and a movable switch blade 45 are mounted thereon. The other end of the bimetal 41 is provided with a shaft 46 which is positioned in a notch 47 provided in an extending support arm 48. A portion of the extending support arm 48 is broken away to show a mating support arm 49 having a like groove supporting the other end of shaft 46, in much the same manner as disclosed in Figure 3. In the apparatus of Figure 4, the magnet 44 is moved by the free end of bimetal 41 whereas the Curie point armature 50 is mounted in fixed position.

The switch means of the modification of Figure 4 includes the movable blade 45 and the stationary contacts 51 and 52. The apparatus of Figure 4 is shown in its closed condition wherein switch 45—51 is closed and switch 45—52 is open. In this modification, a temperature rise of bimetal 41 causes the free end of 43 thereof to move in a downward direction. However, in accordance with the teachings of the above mentioned copending Theodore E. Larsen application, the switch 45—51 remains closed until the Curie point armature 50 has been heated to a given temperature. Thereupon, the switch 45—51 opens and the switch 45—52 closes. A subsequent temperature rise of bimetal 41 causes the contact force between members 45 and 52 to increase until a point is reached where the stress or force built up in bimetal 41 is such as to cause rotation of shaft 46 within the grooves provided in the support members. Here again, spring 53 both mounts bimetal 41 and also exerts a slip friction force which determines the contact pressure which may be built up at the switches 45—52 and 45—51.

Referring now to Figure 5, this figure shows a further modification of the present invention wherein a condition sensitive bimetal 61 mounts a movable switch contact 62 at the free end thereof and is provided with a shaft 63 at the other end thereof. This shaft 63 is mounted in a groove or indentation 64 provided in a support arm 65. A portion of the support arm 65 is broken away to expose a further support arm 66 which is provided with a like groove to receive the other end of shaft 63, much the same as the construction disclosed in Figures 3 and 4.

The reference numerals 67 and 68 identify fixed contacts which are mounted to a base member 69. The reference numeral 70 identifies a Curie point armature which cooperates with a magnet 71 in accordance with the teachings of the above mentioned co-pending Theodore E. Larsen application. The apparatus of Figure 5 is shown in its cold condition wherein the switch 62—68 is closed and the switch 62—67 is open. Upon bimetal 61 experiencing a temperature rise, the left-hand end thereof moves in an upward direction. However, this movement is restrained by the action of magnet 71 and Curie point armature 70 until the armature 70 has been heated to a given temperature. Thereupon, the switch 62—68 is opened and the switch 62—67 is closed. Upon bimetal 61 experiencing a subsequent temperature rise, contact pressure between members 62 and 67 increases to a point where shaft 63 rotates in the grooves provided in the supporting arms. Here again, a single spring member 75 is provided to both mount bimetal 61 in relation to the support arms and to also exert a slip friction force which determines the contact pressure which can be built up at switches 62—67 and 62—68.

From the above description, it can be seen that I have provided an improved condition sensor wherein a relatively inexpensive and simple and yet reliable slip friction means is provided. Specifically, I have provided an improved condition sensor wherein the condition sensing element 21 is mounted by means of a spring in open grooves or in indentations provided in a pair of support arms by means, the spring member not only mechanically mounting the element 21 within the grooves or indentations but also exerting a slip friction force determining the force which may be built up by the free end of the bimetal 21 before the shaft 30 moves in relation to the support arms.

Other modifications of the present invention will be apparent to those skilled in the art and it is intended that the scope of the present invention be limited solely to the scope of the appended claims.

I claim as my invention:

1. A condition sensor comprising; a support member having a pair of extending arms, each of which is provided with an open notch, a bimetal condition sensing member having a movable switch member mounted at one end thereof and having a shaft rigidly mounted at the other end thereof, a spring member mounted in fixed relation to said support member and having a free end extending in the vicinity of the axis defined by the notches in said pair of extending arms such that upon said shaft being positioned in said notches, said spring member engages said shaft and exerts a force to both mount said shaft in relation to said support member and to also provide a slip friction force which must be overcome before said shaft rotates in said notches, and a stationary switch member fixed in relation to said support member and placed in alignment with said movable switch member such that upon said bimetal experiencing a change in temperature, said movable switch member moves into engagement with said stationary switch member and exerts a contact force determined by the slip friction force exerted by said spring member.

2. A bimetal flame detector adapted to be positioned to view the flame at a fuel burner unit, comprising; a base member including a housing having a portion allowing viewing of the fuel burner flame, a support member mounted on said base member and provided with a pair of extending arms each of which includes an open indentation, a bimetal condition sensor having a movable switch contact mounted at one end thereof and having a shaft rigidly mounted at the other end thereof, said shaft being adapted to be positioned within said indentations, a spring member mounted in fixed relation to said base member and engaging said shaft to mechanically mount said shaft within said indentations so that said bimetal member views the flame at the fuel burner unit through said portion of said housing, said spring member also functioning to exert a slip friction force between said shaft and said extending arms, and a stationary switch contact mounted on said base member and mating with said movable switch contact such that upon said bimetal member experiencing a given temperature change, said movable switch contact moves into engagement with said stationary switch contact and exerts a contact force the magnitude of which is determined by the slip friction force exerted by said spring member.

References Cited in the file of this patent

UNITED STATES PATENTS

| | | |
|---|---|---|
| 458,228 | Elliott | Aug. 25, 1891 |
| 653,397 | Pettijohn | July 10, 1900 |
| 2,069,002 | Beman | Jan. 26, 1937 |
| 2,441,137 | De Anthony | May 11, 1948 |
| 2,660,645 | Deubel | Nov. 24, 1953 |
| 2,830,465 | Eskridge | Apr. 15, 1958 |
| 2,855,227 | Bottom | Oct. 7, 1958 |